US008700945B1

(12) United States Patent
Allen et al.

(10) Patent No.: US 8,700,945 B1
(45) Date of Patent: Apr. 15, 2014

(54) CONTENT DELIVERY FAILOVER

(75) Inventors: Nicholas A. Allen, Redmond, WA (US);
Matthew J. Morrisson, Kent, WA (US)

(73) Assignee: Amazon Technologies, Inc., Reno, NV (US)

( * ) Notice: Subject to any disclaimer, the term of this patent is extended or adjusted under 35 U.S.C. 154(b) by 228 days.

(21) Appl. No.: 13/243,687

(22) Filed: Sep. 23, 2011

(51) Int. Cl.
*G06F 11/00* (2006.01)

(52) U.S. Cl.
USPC ........................................................ 714/4.11

(58) Field of Classification Search
USPC ........................................................ 714/4.11
See application file for complete search history.

(56) References Cited

U.S. PATENT DOCUMENTS

| | | | |
|---|---|---|---|
| 6,484,143 B1 | 11/2002 | Swildens et al. | |
| 7,111,057 B1 * | 9/2006 | Sherman et al. | 709/223 |
| 7,266,556 B1 | 9/2007 | Coates | |
| 7,281,168 B1 | 10/2007 | Coates et al. | |
| 7,822,871 B2 | 10/2010 | Stolorz et al. | |
| 7,860,964 B2 | 12/2010 | Brady et al. | |
| 7,953,883 B2 | 5/2011 | Thomas et al. | |
| 7,991,910 B2 * | 8/2011 | Richardson et al. | 709/238 |
| 8,028,090 B2 * | 9/2011 | Richardson et al. | 709/238 |
| 8,234,403 B2 * | 7/2012 | Richardson et al. | 709/238 |
| 8,266,305 B2 * | 9/2012 | Sherman et al. | 709/229 |
| 8,321,588 B2 * | 11/2012 | Richardson et al. | 709/238 |
| 8,370,460 B1 * | 2/2013 | Khakpour et al. | 709/219 |
| 8,423,667 B2 * | 4/2013 | Richardson et al. | 709/242 |
| 8,458,360 B2 * | 6/2013 | Richardson et al. | 709/238 |
| 2007/0174442 A1 * | 7/2007 | Sherman et al. | 709/223 |
| 2010/0125675 A1 * | 5/2010 | Richardson et al. | 709/242 |
| 2011/0145386 A1 | 6/2011 | Stolorz et al. | |
| 2011/0145437 A1 * | 6/2011 | Niven-Jenkins et al. | 709/238 |
| 2011/0161461 A1 * | 6/2011 | Niven-Jenkins et al. | 709/217 |
| 2011/0196943 A1 * | 8/2011 | Bornstein et al. | 709/219 |
| 2011/0258342 A1 * | 10/2011 | Gagliardi et al. | 709/241 |
| 2011/0276657 A1 * | 11/2011 | LeBlanc et al. | 709/219 |
| 2012/0036238 A1 * | 2/2012 | Sundaram et al. | 709/221 |
| 2012/0066408 A1 * | 3/2012 | Richardson et al. | 709/238 |
| 2012/0265900 A1 * | 10/2012 | Richardson et al. | 709/242 |

\* cited by examiner

*Primary Examiner* — Kamini Patel
(74) *Attorney, Agent, or Firm* — Robert C. Kowert; Meyertons, Hood, Kivlin, Kowert & Goetzel, P.C.

(57) ABSTRACT

Embodiments may include a delivery mechanism failover. In one embodiment, a first portion of content and a first direction may be provided in response to a request for the content. The first direction may indicate a delivery mechanism from which to retrieve a second portion of the content. An indication of a failed delivery of the second portion of the content from the delivery mechanism may be received. In some embodiments, the indication of the failed delivery may be stored. Based on the received indication of the failed delivery, the first portion and a second direction may be provided in response to another request for the content, with the second direction indicating that the second portion is to be retrieved from another delivery mechanism.

26 Claims, 5 Drawing Sheets

CONTENT DELIVERY FAILOVER

BACKGROUND

A content delivery network (CDN) is a network of servers containing copies of a resource located at various points within a larger network. In modern web applications, CDNs can deliver resources with lower latency and lower cost than by serving the resources from an application server. However, the structure of a CDN is often opaque to the operator of the application. A CDN may comprise hundreds of locations (called points of presence (POPs)) at which a resource may be cached. These individual POPs may fail, such as by delivering corrupt copies of a resource, in a manner difficult for the application operator to detect. Such difficulties are only magnified for large resources, such as large web applications. CDNs are reluctant to reveal exact POP locations and monitoring such a large number of caches can be unwieldy. As a result, CDNs lack the resolution to know about a partial failure (e.g., corrupt individual file). Typically, client-side mechanisms are used to recover from delivery failures. When the client detects a delivery failure, the client attempts to directly fetch the resource from another location. With purely client-side approaches, however, the ability to route around failures is limited to the knowledge of the client and does not benefit the broader community of users of the application.

While content delivery failover is described herein by way of example for several embodiments and illustrative drawings, those skilled in the art will recognize that content delivery failover is not limited to the embodiments or drawings described. It should be understood, that the drawings and detailed description thereto are not intended to limit content delivery failover to the particular form disclosed, but on the contrary, the intention is to cover all modifications, equivalents and alternatives falling within the spirit and scope of content delivery failover as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Figure 1:
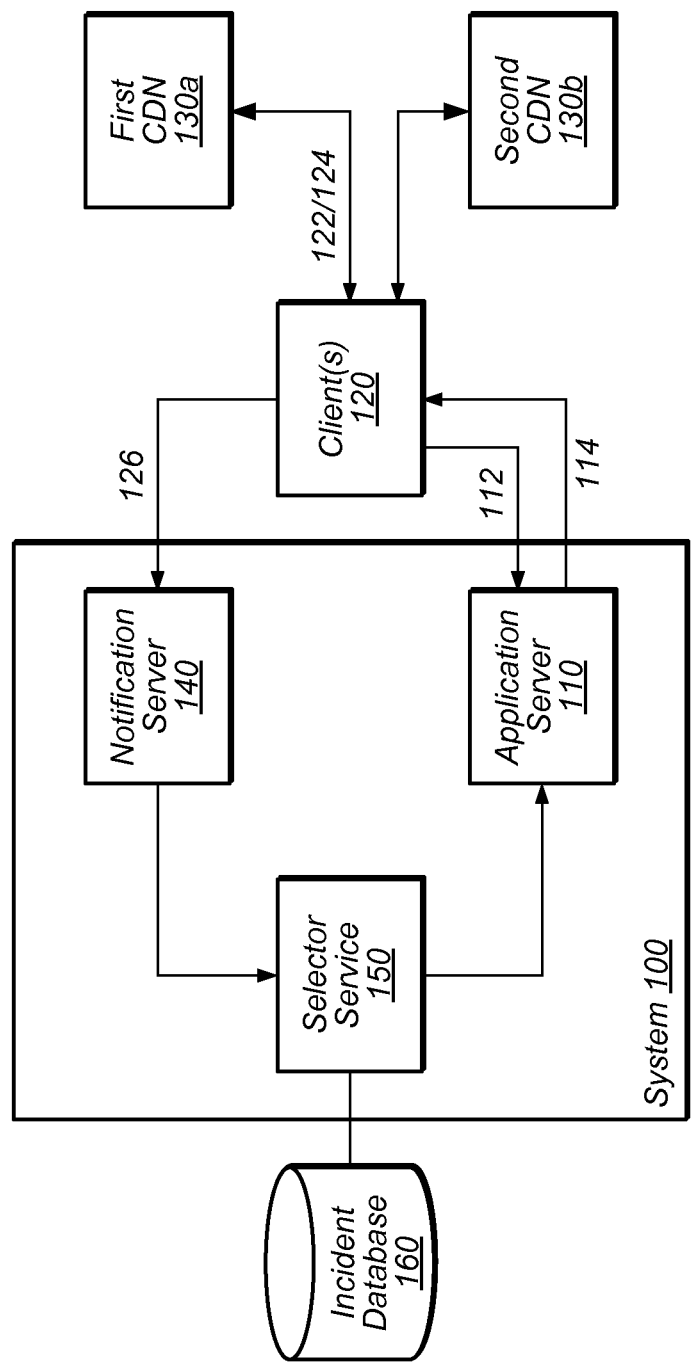
FIG. 1 illustrates a block diagram of a system and method for content delivery failover, according to some embodiments.

Various embodiments of content delivery failover are described. FIG. 1 illustrates an example system 100 that may provide for automatic failover of content delivery. In the illustrated embodiment, system 100 includes application origin server 110, notification server 140, and selector service 150. System 100 may interface with one or more client computers 120, incident database 160, and a number of content delivery networks (CDNs) 130*a* and 130*b*. In one embodiment, incident database 160 may be part of system 100. In various embodiments, application origin server 110, notification server 140, and selector service 150 may be collocated, for example, on the same computing device. In various embodiments, system 100 may be configured to automatically fail over to a different CDN. Although the description is written in terms of CDNs, the disclosed embodiments apply equally to other delivery mechanisms.

In one embodiment, application origin server 110 may transmit a first, or initial, portion of content (e.g., a file, a web application, etc.), shown in FIG. 1 as 114, to a first client computer 120. For example, the transmission of the first portion of the content may be in response to a request 112 generated by a user at the first client computer 120 operating a web browser to navigate to a uniform resource locator (URL) served by application origin server 110. In one embodiment, the first portion of the content may include a direction or instruction that may function as a bootstrap to load the remainder of the content. Application origin server 110 may be capable of responding to static requests that typically provide the same response, such as providing the remaining portion of the content to first client computer 120. In some embodiments, however, other servers (e.g., CDNs) may handle static requests more efficiently than the application origin server 110. For instance, first CDN 130*a* and second CDN 130*b* may respond with less latency, more bandwidth, and may be cheaper to operate than application origin server 110. As a result, in some embodiments, the bootstrap may direct the first client computer 120 to retrieve a second portion (e.g., remaining portion, portion other than the first portion) of the content from a CDN (e.g., first CDN 130*a*, second CDN 130*b*, or another CDN not shown in FIG. 1). The bootstrap, or direction, may provide the client computer 120 with a domain name, which may be resolved through DNS to a particular CDN and POP location. Each CDN may have a geographical distribution of DNS servers and use it to induce the client to go to the closest location (e.g., closest POP).

In one embodiment, the bootstrap response may be implemented by application origin server 110 serving an HTML document that remotely references content and scripts stored on a CDN. The remote references, or directions, may be direct references embedded in the HTML document or may be calls performed by a script (e.g., an AJAX request by a JavaScript script included in the initial portion of the web application).

In various instances, first client computer 120 may fail to retrieve 122 the second portion of the content (e.g., file, web application) from first CDN 130*a*. For instance, first client computer 120 may execute the bootstrap response provided by application origin server 110 to remotely access resources served by first CDN 130*a*. First CDN 130*a* may not be perfectly reliable. For example, first CDN 130*a* may be slow, incorrectly configured, or may malfunction in some way as to fail to transmit the second portion of the web application to first client computer 120. Or, first CDN 130*a* may store corrupt content. As a result, first client computer 120 may receive 124 a corrupt second portion of content from first CDN 130*a*.

Generally speaking, a CDN may fail in a variety of manners. For example, a CDN may fail in a simply detected fashion, such as the CDN being unavailable or the response from the CDN not arriving within a predetermined time (e.g., 30 seconds, 60 seconds, 90 seconds, etc.). In other cases, a CDN may fail in a more complex fashion. For instance, the CDN may return a response that is corrupt or unusable. It may be difficult or slow to directly verify the returned response. A web browser may limit introspection of the return response by application code. As a result, detection logic may be included in the first and/or second portions of the content such that corrupt responses may be detectable, even if in an indirect fashion.

Figure 2:
FIGS. 2-3 illustrate example file formats to detect file corruption, according to some embodiments.

One type of corrupt response may be a truncated file. A CDN may return a response that contains only part of the second portion of the content. For example, the end of the second portion of the content may be cut off so that the received second portion of content is incomplete. In one embodiment, the second portion of content may include detection logic, as shown in FIG. 2, to identify truncated files. In the example detection logic of FIG. 2, in addition to an application segment, a bootstrap segment may be included in the content that is configured to call a callback after the second portion of the content is loaded. For example, the content may be configured to call the callback upon receiving a signal that the second portion of the content is loaded or by waiting a predetermined number of seconds that is expected to be sufficient to load the second portion of the content. As shown in FIG. 2, the second portion of the content may also include a sentinel segment. The sentinel segment may be located close to the end of the second portion. For example, as shown in FIG. 2, the sentinel segment may be located at the end of the second portion of content. In other examples, additional segments of content may be located after the sentinel segment. In one embodiment, the sentinel segment may, when loaded, set a flag or variable that signals the presence of the sentinel segment. The callback that was invoked by the bootstrap segment may then examine whether the flag or variable for the sentinel segment was signaled. If not signaled by the time (e.g., 30 seconds, 60 seconds, 90 seconds, etc.) the callback executes, the callback may infer that the sentinel segment was not received and that the CDN response (e.g., delivery, transmission) is corrupt.

Figure 3:

Another type of corrupt response may be a garbled file. For example, a block of bytes within the content may be arbitrarily inserted, deleted, or modified during transmission from the CDN, or even within the recorded copy of the content stored by the CDN. The second portion of content (e.g., file, application) may include detection logic to identify a garbled file, as shown in FIG. 3. As shown, in addition to one or more application segments, the second portion of content may include a bootstrap segment that is configured to call a callback after the second portion of the file is loaded. For example, the content may be configured to call the callback upon receiving a signal that the second portion of the content is loaded or by waiting a predetermined number of seconds that is expected to be sufficient to load the second portion of the content. One or more checksum segments may also be included in the second portion of the content, as shown in FIG. 3. A checksum segment may be a data element computed by executing an algorithm against a representation of part of the original copy of the content. The callback invoked by the bootstrap segment may execute the same algorithm against a representation of the same portion of the received copy of the content. For instance, the checksum algorithm may compute a checksum based on bytes received, code segments, function definitions, or other aspects of the content that can be introspected by the content code. If the checksum algorithm does not match the checksum segment, the callback may infer that the CDN response is corrupt.

Turning back to FIG. 1, in one embodiment, in response to detecting a corrupt response from first CDN 130a, first client computer 120 may transmit an error notification 126 to notification server 140. As one example, the error notification may be an AJAX request made by a callback function that detected that the CDN response was corrupt. Notification server 140 may be an endpoint of application origin server 110 or it may be a separate server system listening for error notification requests. In an embodiment where notification server 140 is part of application origin server 110, each may use the same port, URL, and domain. In such an embodiment, though, error notifications and requests for content may be distinguished from each other so that each type may be processed appropriately. An error notification may include any of the following data: the identity of the user making the request for content, a geographic description of where the user resides, the IP address or other identifying information of the client computer, the file, resource, or content that the application was attempting to retrieve, the IP address or other identifying information of the CDN server that was accessed, or DNS lookups, trace routes, or other diagnostic information relating to the failed request to the CDN server.

In various embodiments, notification server 140 may record the error notification in incident database 160. Incident database 160 may be a relational database written to disk that can be queried for received error notification requests according to the submitted data. In other embodiments, the incident database may be kept in memory replicated to each machine running selector service 150 using a gossip protocol. Thus, in some embodiments, incident database 160 may be part of system 100. Replicating the incident database locally may have operational benefits, for example, by eliminating the single point of failure of a traditional relational database system. The incident database may, from time to time, be purged of old or unneeded records. For instance, the incident database may be configured with a policy to delete error notifications after a period of time (e.g. one hour, one day, one week, etc.). The incident database may also be purged after operational changes are made to the system. As one example, incident database 160 may contain one or more records relating to a failed content server. After the failed content server is fixed, the incident database may be instructed to delete error notifications related to the previously failed content server.

In one embodiment, application origin server 110 may receive a request for content from second client computer 120. Second client computer 120 may be the same client computer as first client computer 120, or may represent a different client computer. Application origin server 110 may pass the client request to selector service 150 to determine the appropriate path for accessing additional portions (e.g., the second portion, other remaining portions) of the content. For example, application origin server 110 may provide selector service 150 with the identity, geographic location, or other features of the requesting client computer, which may have been received by application origin server 110 with the request for content. Selector service 150 may respond with a path for access based on the provided information and records from incident database 160. In one embodiment, selector service may favor advertising a first CDN over a second CDN, except when adverse indicators are present for the first CDN in the incident database. In such an embodiment, the first CDN may be a primary CDN while the second CDN may be a backup CDN. Adverse indicators may include failed attempts to retrieve files from the identified user or from other users nearby the identified user. Nearby users may be defined as a geographic function, such as common country, state, province, region, or city. In other instances, nearby users may be defined as a function of the local CDN POPs when such data is known. Selector service 150 may weight error notifications based on proximity. For example, the decision to advertise the backup CDN may be made based on two failure reports in the same city but may require ten failure reports in the same province (with different cities). As a result of selector service 150 determining which CDN to advertise, application origin server 110 may transmit the first portion of the content to second client computer 120 and a second direction based on the advertised CDN, in response to second client computer 120 requesting the content.

In other embodiments, selector service 150 may further incorporate round robin selection, weighted selection, random selection, or other techniques to select between CDNs. Such techniques may not necessarily select the primary CDN, even in the absence of adverse indicators. For example, selector service 150 may implement service tiers. For example, selector service 150 may, via application origin server 110, direct a client 120 to use a faster CDN for a subscriber who subscribes to a higher tier service level. Selector service 150 may also direct a client 120 to a slower CDN for a subscriber who subscribes to a lower tier service level. Tiered service levels may be implemented in addition to or instead of the described failover techniques.

Although FIG. 1 illustrates two CDNS, first CDN 130*a* and second CDN 130*b*, many CDNs may exist as part of the overall network. Accordingly, selector service 150 may select among the various CDNs and is not limited to just first CDN 130*a* and second CDN 130*b*. In one embodiment, in response to direction from application server 110, second client computer 120 may retrieve the second portion of the content from second CDN 130*b*. Accessing second CDN 130*b* may be performed similarly to accessing first CDN 130*b*. In some embodiments, the fallback process may be repeated so as to consider a third CDN, fourth CDN, and so on depending on the failures encountered or other factors. In some instances, application origin server 110 may directly provide the second portion of the content to a client computer 120, for example, if multiple CDNs have failed.

Figure 4:
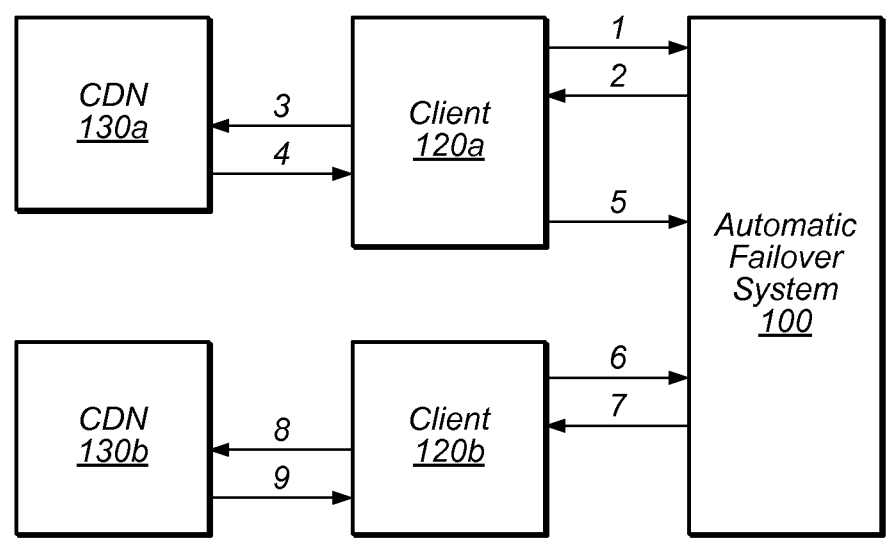
FIG. 4 illustrates an example implementation of content delivery failover, according to some embodiments.

An example implementation of content delivery failover is shown in FIG. 4. Although the example in FIG. 4 illustrates two clients 120 and two CDNs 130, any number of clients and CDNs may exist. Moreover, automatic failover system 100 may actually be a plurality of systems coupled over a network. Thus, in reference to FIG. 1, each of the plurality of systems may include an application origin server, selector service, and notification server. The numbers next to the arrows connecting the various components in FIG. 4 are an example operational order of content delivery failover during operation. Other orders may occur in various embodiments.

Arrow 1 may represent automatic failover system 100 receiving a request for content from one of the clients, client 120*a*. Automatic failover system 100 may respond to the request, shown as 2 in the figure, by providing a first portion of the content to client 120*a*. Automatic failover system 100 may include, as part of the response to the request, a direction to client 120*a* to retrieve the second portion of the content from CDN 130*a*. Client 120*a* may attempt to retrieve the content, shown as 3, from CDN 130*a*. CDN 130*a* may fail to deliver the second portion of the content to client 120*a*. For example, the failed delivery, shown as 4, may be a truncated or garbled second portion of the content. Client 120*a* may then provide an indication (e.g., error notification) of the failed delivery to automatic failover system 100, shown as 5 in FIG. 4. At 6, a different client, client 120*b* may request the same content from automatic failover system 100. Based on the received indication of the failed delivery, automatic failover system 100 may determine that CDN 130*a* has failed with respect to that content. As a result, automatic failover system 100, shown at 7, may respond to client 120*b*'s request by providing the first portion of the content and, because of the previous failure, direction to client 120*b* to retrieve the second portion of the content from a different CDN, CDN 130*b*. Client 120*b* may request, at 8, and properly receive, at 9, the second portion of the content from CDN 130*b*. As described herein, in some cases, client 120*b* may be the same client as client 120*a*.

By detecting potential failures and automatically switching between delivery mechanisms, operation of individual POPs may be validated and content (e.g., large web applications) may be made more robust to localized CDN failures. Moreover, the broader community of users of the application may benefit by not limiting the failover system to the knowledge and response of a single client. Additionally, partial failures, which may be specific to particular content (e.g., garbled or truncated content), may be identified even when a CDN otherwise appears to be operating normally.

Figure 5:
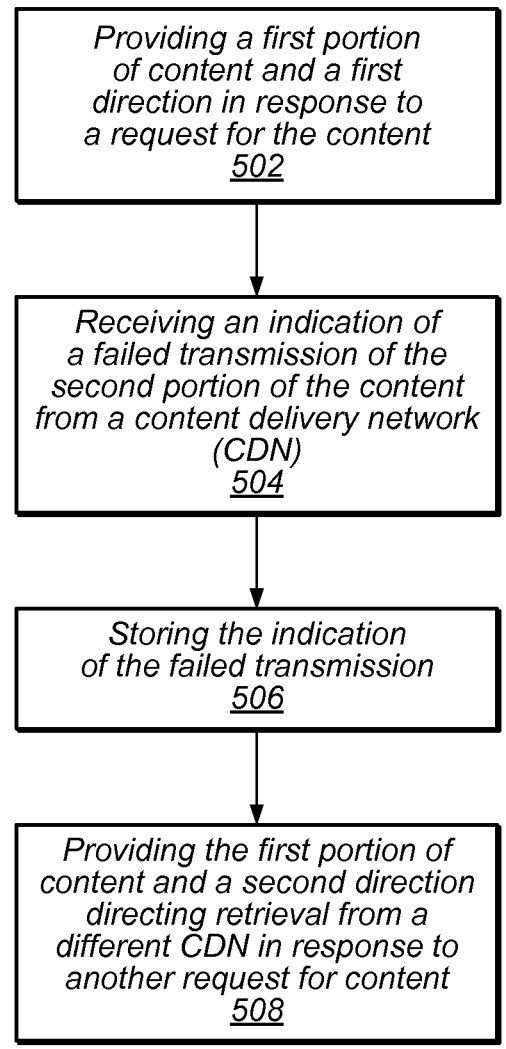
FIG. 5 illustrates a flowchart of an example method for content delivery failover, according to some embodiments.

In various embodiments, system 100 may be configured to automatically fail over to a different CDN according to a method for content delivery network failover, such as that of FIG. 5. While the method of FIG. 5 may be described as being performed by various components of system 100 (e.g. application origin server 110, notification server 140, selector service 150), the method need not be performed by any specific component in some cases. For instance, in some cases, the method of FIG. 5 may be performed by some other component or computer system, according to some embodiments. Or, in some cases, components of system 100 may be combined or exist in a different manner than that shown in the example of FIG. 1. In various embodiments, the method of FIG. 5 may be performed by a computer, such as the computer system of FIG. 6. The method of FIG. 5 is shown as one example implementation of a method for automatic content delivery failover. In other implementations, the method of FIG. 5 may include additional or fewer blocks than are shown.

As illustrated at block 502, a first portion of content and a first direction may be provided, for example by application origin server 110, to a client in response to a request for the content from the client. The requested content may be a file, web application, or similar content. The first direction may direct the client to retrieve a second portion of the content from a CDN, or other delivery mechanism. The CDN to which the client is directed may be a default CDN (e.g., closest geographically to the requesting client, lowest cost CDN to use, etc.) that may be used in the absence of any current failures.

As shown at block 504, an indication of a failed transmission/delivery of the second portion of the content from the CDN may be received from the client, for example by notification server 140. In some embodiments, indication of a failed transmission may be based on the second portion of content from the CDN being corrupt. Corrupt content (e.g., file, web application, etc.) may include garbled, truncated, or otherwise corrupt content. In one embodiment, the indication that a delivery mechanism failed to deliver content to a client may be based on execution of detection logic included in the content.

As illustrated at block 506, the indication of the failed transmission may be stored. In one embodiment, storing an indication of the failed transmission may be stored in one or more databases (e.g., incident database 160). The indication may be stored in a single centralized database or may be stored in one of a number of databases. For instance, each node running selector service 150 may include or have access to a local database. In such a scenario, the various local databases may be synchronized from time to time to maintain consistency among the databases. The synchronization may occur periodically or upon the occurrence of an event (e.g., upon receiving a new failure indication).

In various embodiments, one or more stored indications may be removed or purged from the database based on a criterion. Criteria may include a time of the failed delivery or a status of repair of the CDN that failed delivery. As an example using the time of the failed delivery, in one embodiment, a failure indication may persist in the database of stored failure indications for a specified time. Upon reaching that time, that particular stored failure indication may be purged from the database as stale data. For example, a failure indication may have a life of minutes, hours, or days. If the life is four hours, then four hours after the failed delivery, the database may be purged of the corresponding failure indication. If that is the only failure indication for the content on that CDN and automatic failover was occurring based on that failure, then upon the next request for the content, the requesting client may be directed by selector service 150, via application origin server 110, to retrieve the second portion of the content from the previously failed CDN. The CDN may or may not still be failed and blocks 502-508 may occur again depending on the success or failure of the attempted retrieval of the content.

In some embodiments, however, the indication of the failed transmission may not be stored locally. For example, in response to receiving an indication of failed delivery from a client, a state or data (e.g., a cookie) may be provided to the client indicative of the failed delivery. Then, when that particular client makes a subsequent request for the content, the cookie may be included as part of the subsequent request for the content. Based on the cookie as part of the request for the content, the first portion of the content and direction to retrieve the second portion of the content from a CDN other than the one that previously failed delivery to the client may be provided to the client. The cookie may include an expiry time to purge the stored indication from the client upon reaching the expiry time.

At block 508, the first portion of the content and a second direction may be provided in response to another request for the content. The second direction may indicate that the second portion of the content is to be retrieved from a different CDN. Selector service 150, through application origin server 110, may provide the second direction based on the stored indication of the failed transmission. In some embodiments, providing the second direction may also be based on at least one other stored indication of a failed transmission from the CDN. For example, in determining from which CDN a client should retrieve the second portion of the content, the database storing indications of failures may be searched and it may be determined whether the CDN has failed. The CDN may be determined as failed, in some embodiments, based on times of failed deliveries and the number of the failed deliveries. In one embodiment, if the sum of the stored indications of failed transmissions/deliveries exceeds a threshold, the CDN may be deemed as failed and an automatic failover may occur to the other CDN whereas if the threshold is not exceeded, the same CDN may be used. Using a threshold, or similar technique, may help ensure that failover occurs in response to a true failure of the CDN, or at least for that particular content in the CDN, and not for transient failures (e.g., browser issue or an isolated network issue) or malicious attacks that attempt to trick the system. In some cases, a failed CDN may be interpreted as having failed with respect to particular content. Thus, for requests for other content, the failed CDN may not be failed with respect to the other content and may still be used by the clients for retrieval of the other portion of the other content.

In one embodiment, the other request for the content may be from a different client than the client who received the failed transmission from the first CDN. In embodiments where the request is from a different client, many factors may influence whether automatic failover occurs. For example, the different client's proximity to the client who experienced the failure, the temporal proximity of the different client's request to the time of the failed delivery, each client's tier classification, and whether the failed CDN has been fixed may be among the various factors that may be used to determine whether to failover to a different CDN. It may also be determined if the other client is similarly situated to the client from which indication of the failed delivery of the content was received. A client may be similarly situated to another client based on geographic location, IP address, likelihood of being on the same POP, etc. In other embodiments, the other request for the content may be from the same client who received the failed transmission. In such embodiments where the request is from the same client who previously experienced a failed transmission, automatic failover may occur.

In some embodiments, additional requests for the content may be made. For instance, in one embodiment, the first portion of the content and the first direction may be provided to another client in response to the additional request for the content. The other client may nevertheless be directed to retrieve the second portion of the content from the same CDN that previously failed a transmission. For example, in one embodiment, a client may be directed to retrieve content from the same CDN if the number of stored indications of failed transmissions from that CDN is below a threshold (e.g., 1 failed transmission to a single client, 3 failed transmissions to clients in the same city, 10 failed transmissions to clients in the same region, etc.).

In some cases, system 100 may have the resolution to determine that the failed delivery by the CDN was from a particular POP. In such a case, system 100 may direct a client to retrieve the other portion of the content from a different POP on the same CDN.

In some embodiments, a client may be directed to retrieve the other portion of the content from a different CDN regardless whether the CDN is determined as failed. For example, other factors may determine which CDN to use. A tiered system may be implemented such that higher-tier subscribers to a service may utilize a primary CDN where as lower-tier subscribes may utilize secondary, tertiary, or other CDNs. Thus, one client may use as its primary CDN, a CDN that is the backup CDN for other clients, even when both CDNs are functioning properly.

In some cases, the content that the CDNs store and provide to requesting/retrieving clients may be provided to the CDNs by system 100 (e.g., application origin server 110). System 100 may preprocess the content and provide the second portion of the content, which may include failure detection logic, to the various CDNs. Preprocessing may include segmenting the content and/or adding various additional code. Two examples of detection logic are shown in FIGS. 2-3, respectively. As a result, failure detection may be included with the second portion of the content such that corrupt content, which may be indicative of failed delivery, may be detected by the requesting client. In some instances, a corrupt version of the content may actually be stored on the CDN. In various embodiments, system 100 may provide a new copy of the content, which may also include detection logic, to replace the previously stored copy. This may help ensure that the stored copy on the CDN is not corrupt. In some instances, failed delivery may be the result of the transmission/delivery path. For example, packets may be dropped or corrupted during transmission from the CDN to the client. In those instances, system 100 may not replace the previously stored copy.

Example Computer System

Various embodiments of the system and method for content delivery failover, as described herein, may be executed on one or more computer systems, which may interact with various other devices. Note that any component, action, or functionality described above with respect to FIGS. 1-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 may be configured to implement any functionality of content delivery failover system 100 described above. Additionally, data 632 of memory 620 may store any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
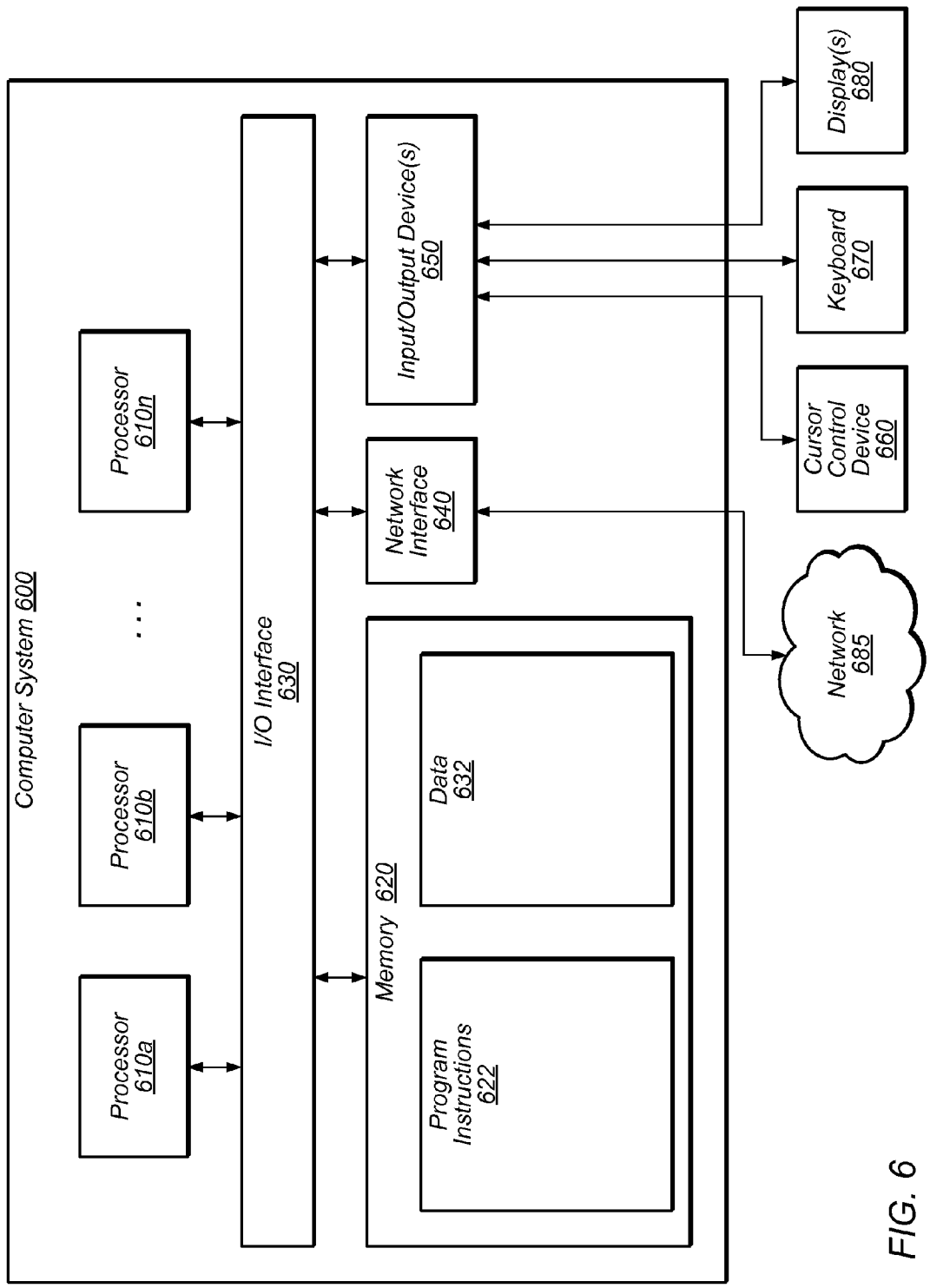
FIG. 6 illustrates one example of a computer system suitable for implementing various elements of content delivery failover, according to some embodiments.

As shown in FIG. 6, memory 620 may include program instructions 622, which may be processor-executable to implement any element or action described above. In one embodiment, the program instructions may implement the methods described above, such as the methods illustrated by FIG. 5. In other embodiments, different elements and data may be included. Note that data 632 may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
providing a first portion of content and a first direction to a first client in response to a request for the content from the first client, wherein the first direction directs the first client to retrieve a second portion of the content from a first content delivery network (CDN);
receiving, from the first client, an indication of a failed transmission of the second portion of the content from the first CDN, wherein the failed transmission is based on the second portion of the content from the first CDN being corrupt;
storing the indication of the failed transmission; and
in response to a second request for the content, providing the first portion of the content and a second direction, wherein the second direction indicates that the second portion of the content is to be retrieved from a second CDN, wherein said providing the first portion of the content and the second direction is based on the stored indication.

2. The method of claim 1, wherein the second request for the content is from a different client than the first client.

3. The method of claim 1, wherein said providing is further based on at least one other stored indication of a failed transmission from the first CDN.

4. The method of claim 1, further comprising:
providing the first portion of the content and the first direction to a second client in response to a third request for the content from the second client;
wherein the second request for the content is from the first client;
wherein a sum of the stored indication and other stored indications of failed transmissions from the first CDN is below a threshold.

5. A computer-implemented method, comprising:
receiving an indication that a delivery mechanism failed to deliver content to an end user, wherein the indication is based at least in part on execution of detection logic included in the content;
in response to a subsequent request for the content:
providing a portion of the content; and
directing retrieval of another portion of the content from another delivery mechanism based at least in part on the failed delivery.

6. The method of claim 5, further comprising:
in response to another request for the content:
determining that a sum of the failed delivery of the content and other failed deliveries of the content by the same delivery mechanism is less than a failover threshold; and
directing retrieval of the other portion of the content from the delivery mechanism.

7. The method of claim 5, wherein the subsequent request for the content is from the end user and said directing retrieval is to the end user from which the indication of the failed delivery of the content was received.

8. The method of claim 7, further comprising:
in response to receiving the indication of the failed delivery of the content, providing data to the end user indicative of the failed delivery;
wherein the data is included as part of the subsequent request for the content;
wherein said directing retrieval is based at least in part on the data from the subsequent request for the content.

9. The method of claim 5, wherein said directing retrieval is to another end user that is similarly situated to the end user from which indication of the failed delivery of the content was received.

10. The method of claim 5, further comprising:
in response to receiving the indication of the failed delivery of the content, storing the indication to a database.

11. The method of claim 10, wherein said directing retrieval is further based on a search of the database for other indications of failed deliveries from the same delivery mechanism.

12. The method of claim 10, further comprising synchronizing the database with other databases storing indications of failed deliveries of content.

13. The method of claim 5, further comprising purging the indication of the failed delivery of the content based on a criterion.

14. The method of claim 5, further comprising:
in response to another request for the content, directing retrieval of the other portion of the content from another delivery mechanism when the delivery mechanism is not determined as failed.

15. The method of claim 5, further comprising prior to said receiving and said directing:
  providing, to the delivery mechanism and the another delivery mechanism, the content including detection logic for detecting failed deliveries for later retrieval by the end user.

16. The method of claim 5, further comprising:
  prior to said providing and directing, determining that the delivery mechanism has failed with respect to the content.

17. The method of claim 16, further comprising:
  in response to a request for different content, providing a portion of the different content and directing retrieval of another portion of the content from the delivery mechanism.

18. A system, comprising:
  a memory; and
  one or more processors coupled to the memory, wherein the memory comprises program instructions executable by the one or more processors to implement failover logic configured to:
    provide a first portion of content and a first instruction to a first client in response to a request for the content from the first client, wherein the first instruction instructs that a second portion of the content is to be retrieved from a first content delivery network (CDN);
    receive, from the first client, an error indicative of a failed delivery of the second portion of the content from the first CDN; and
    in response to receiving the error, provide the first portion of the content and a second instruction in response to a second request for the content, wherein the second instruction instructs the second portion of the content to be retrieved from a second CDN.

19. The system of claim 18, wherein the failover logic is further configured to:
  in response to another request for the content:
    determine that a total number of errors indicative of failed deliveries, including the error indicative of the failed delivery, does not exceed a threshold;
    provide the first portion of the content; and
    provide the first instruction.

20. The system of claim 18, wherein the second request for the content is from a client other than the first client.

21. The system of claim 18, wherein the failover logic is further configured to:
  prior to said providing the first portion of the content and the second instruction in response to the second request, determine that the first CDN has failed with respect to the content based on the error indicative of the failed delivery of the content and at least one other error indicative of failed delivery of the content from the first CDN.

22. The system of claim 21, wherein the failover logic is further configured to:
  in response to a request for different content, provide a first portion of the different content and another first instruction, wherein the another first instruction instructs that a second portion of the different content is to be retrieved from the first CDN.

23. A non-transitory computer-readable storage medium storing program instructions, wherein the program instructions are computer-executable to implement:
  determining that a content delivery network (CDN) has failed with respect to at least some content based on one or more received indications of failed delivery of content from one or more clients;
  in response to a request for the content:
    providing a portion of the content; and
    directing retrieval of another portion of the content from another CDN based on said determining.

24. The non-transitory computer-readable storage medium of claim 23, wherein the program instructions are further computer-executable to implement:
  purging at least one of the one or more received indications of failed delivery of content;
  based on said purging, determining that the CDN is no longer failed; and
  in response to another request for the content:
    providing the portion of the content; and
    directing retrieval of the other portion of the content from the CDN.

25. The non-transitory computer-readable storage medium of claim 23, wherein the program instructions are further computer-executable to implement:
  storing the one or more received indications of failed delivery of content to a database.

26. The non-transitory computer-readable storage medium of claim 23, wherein the request is from a client that is not one of the one or more clients.

* * * * *